(12) United States Patent
Huang

(10) Patent No.: US 12,530,782 B2
(45) Date of Patent: Jan. 20, 2026

(54) INSTANCE SEGMENTATION SYSTEMS AND METHODS FOR SPAD LIDAR

(71) Applicants: DENSO International America, Inc., Southfield, MI (US); DENSO CORPORATION, Kariya (JP)

(72) Inventor: Minglei Huang, Farmington, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 495 days.

(21) Appl. No.: 18/145,948

(22) Filed: Dec. 23, 2022

(65) Prior Publication Data

US 2024/0029271 A1 Jan. 25, 2024

Related U.S. Application Data

(60) Provisional application No. 63/391,924, filed on Jul. 25, 2022.

(51) Int. Cl.
*G06T 7/194* (2017.01)
*G01S 17/89* (2020.01)
(Continued)

(52) U.S. Cl.
CPC .............. *G06T 7/194* (2017.01); *G01S 17/89* (2013.01); *G06T 7/60* (2013.01); *G06T 7/70* (2017.01); *G06T 17/00* (2013.01); *G06V 10/764* (2022.01); *G06T 2207/10048* (2013.01); *G06T 2207/20084* (2013.01)

(58) Field of Classification Search
CPC .. G06T 7/194; G06T 7/70; G06T 7/60; G06T 17/00; G06T 2207/10048; G06T 2207/20084; G06V 10/764; G01S 17/89; G01S 17/88; G01S 17/10; G01S 7/4863
See application file for complete search history.

(56) References Cited

U.S. PATENT DOCUMENTS 10,106,153 B1 * 10/2018 Xiao ..................... B62D 15/02
12,183,010 B2 * 12/2024 Tang ..................... G06N 3/044
(Continued)

OTHER PUBLICATIONS

Man, Y., Weng, X., Sivakuma, P.K., O'Toole, M., & Kitani, K. (2021). Multi-Echo LiDAR for 3D Object Detection. 2021 IEEE/CVF International Conference on Computer Vision (ICCV), 3743-3752. (Year: 2021).*

(Continued)

*Primary Examiner* — Utpal D Shah
*Assistant Examiner* — Jack Peter Kraynak
(74) *Attorney, Agent, or Firm* — Harness, Dickey & Pierce, P.L.C.

(57) ABSTRACT

A computerized method for instance segmentation using single-photon avalanche diode (SPAD) light detection and ranging (Lidar) includes obtaining sensor image data from photon detector of an SPAD Lidar sensor, supplying the obtained sensor image data to a two-dimensional convolutional neural network (CNN) to generate a background mask by identifying target objects in the obtained sensor image data and filtering out background pixels that do not belong to the identified target objects, and supplying point cloud data of the identified target objects to a PointNet model to generate a pixel level instance segmentation output of the identified target objects.

16 Claims, 9 Drawing Sheets

(51) Int. Cl.
- *G06T 7/60* (2017.01)
- *G06T 7/70* (2017.01)
- *G06T 17/00* (2006.01)
- *G06V 10/764* (2022.01)

(56) References Cited

U.S. PATENT DOCUMENTS

| | | | | |
|---|---|---|---|---|
| 2021/0302544 | A1* | 9/2021 | Honal | G06N 3/045 |
| 2022/0027675 | A1* | 1/2022 | Sheu | G01S 17/931 |
| 2022/0172495 | A1* | 6/2022 | Sheu | G06V 10/774 |
| 2022/0180548 | A1* | 6/2022 | Li | G06V 10/766 |
| 2023/0177818 | A1* | 6/2023 | Kaithakauzha | G06V 10/764 |
| | | | | 382/106 |
| 2024/0161325 | A1* | 5/2024 | Verstraete | G06V 20/188 |

OTHER PUBLICATIONS

Charles R. Qi, Wei Liu, Chenxia Wu, Hao Su, Leonidas J. Guibas; Frustum PointNets for 3D Object Detection from RGB-D Data, Proceedings of the IEEE Conference on Computer Vision and Pattern Recognition (CVPR), 2018, pp. 918-927 (Year: 2018).*

Charles R. Qi, Hao Su, Kaichun Mo, Leonidas J. Guibas; PointNet: Deep Learning on Point Sets for 3D Classification and Segmentation, Proceedings of the IEEE Conference on Computer Vision and Pattern Recognition (CVPR), 2017, pp. 652-660 (Year : 2017).*

G. Chen, C. Wiede and R. Kokozinski, "Data Processing Approaches on SPAD-Based d-TOF LiDAR Systems: A Review," in IEEE Sensors Journal, vol. 21, No. 5, pp. 5656-5667, 1 Mar. 1, 2021, doi: 10.1109/JSEN.2020.3038487. (Year: 2021).*

P. Biasutti, . . . , "LU-Net: An Efficient Network for 3D LiDAR Point Cloud Semantic Segmentation Based on End-to-End-Learned 3D Features and U-Net," in 2019 IEEE/CVF International Conference on Computer Vision Workshop (ICCVW), Seoul, Korea (South), 2019, pp. 942-950, doi: 10.1109/ICCVW.2019.00123. (Year: 2019).*

A. Milioto, I. Vizzo, J. Behley and C. Stachniss, "RangeNet ++: Fast and Accurate LiDAR Semantic Segmentation," 2019 IEEE/RSJ International Conference on Intelligent Robots and Systems (IROS), Macau, China, 2019, pp. 4213-4220, doi: 10.1109/IROS40897.2019.8967762. (Year: 2019).*

Ronneberger, O., . . . (2015). U-Net: Convolutional Networks for Biomedical Image Segmentation. In: Navab, N., Hornegger, J., Wells, W., Frangi, A. (eds) Medical Image Computing and Computer-Assisted Intervention—MICCAI 2015. MICCAI 2015. Lecture Notes in Computer Science(), vol. 9351. Springer, Cham. (Year: 2015).*

"Multi-Echo LiDAR for 3D Object Detection," Y. Man, et al., arXiv:2017.11470v1 [cs.CV], Jul. 23, 2021, 14 pages.

* cited by examiner

INSTANCE SEGMENTATION SYSTEMS AND METHODS FOR SPAD LIDAR

CROSS-REFERENCE TO RELATED APPLICATIONS

This application claims the benefit of U.S. Provisional Application No. 63/391,924, filed on Jul. 25, 2022. The entire disclosure of the above application is incorporated herein by reference.

FIELD

The present disclosure relates to single-photon avalanche diode (SPAD) Lidar systems and methods, and, more particularly, to instance segmentation systems and methods for SPAD Lidar.

BACKGROUND

Panoptic segmentation is a challenging and desirable target in the area of computer recognition. From class classification, semantic recognition, object classification, and instance segmentation, to panoptic segmentation, neural network based solutions increase the accuracy and precision of these tasks. Most approaches, however, only focus on either image (DeepLab, MASK-RCNN) or point cloud (Point-RCNN, Voxelnet) and cannot fully utilize the capacity of SPAD Lidar systems, such as DENSO's SPAD Lidar system. DeepLab, for example, is a semantic segmentation model designed and open-sourced by Google in which dense prediction is achieved by up-sampling the output of a last convolution layer and computing pixel-wise loss. MASK-RCNN, or Mask region-based convolutional neural network (RCNN) is a type of machine learning model used for computer vision tasks, such as object detection, and includes semantic segmentation and instance segmentation. Point-RCNN is a two-stage 3D object detector for 3D object detection using only raw point cloud data as input. Voxelnet is a 3D detection network that uses feature extraction and bounding box prediction into a single stage, end-to-end trainable deep network, divides a point cloud into equally spaced 3D voxels, and transforms a group of points within each voxel into a unified feature representation through a voxel feature encoding layer. These approaches, however, only focus on either image (DeepLab, MASK-RCNN) or point cloud (Point-RCNN, Voxelnet) and cannot fully utilize the capacity of SPAD Lidar systems, such as DENSO's SPAD Lidar system.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computerized method for instance segmentation using single-photon avalanche diode (SPAD) light detection and ranging (Lidar) includes obtaining sensor image data from photon detector of an SPAD Lidar sensor, supplying the obtained sensor image data to a two-dimensional convolutional neural network (CNN) to generate a background mask by identifying target objects in the obtained sensor image data and filtering out background pixels that do not belong to the identified target objects, and supplying point cloud data of the identified target objects to a PointNet model to generate a pixel level instance segmentation output of the identified target objects.

In other features, the Lidar sensor is configured to obtain multiple return signals with a single laser pulse, capture infrared (IR) light to capture ambient scene illumination, and capture surface reflectance by measuring a strength of a detected laser pulse. In other features, supplying point cloud data of the identified target objects to the PointNet model includes supplying only point cloud data associated with the identified target objects, without supplying point cloud data associated with identified background pixels to the PointNet model.

In other features, the method includes training the two-dimensional CNN with historical sensor image data from SPAD Lidar sensors to generate the background mask, wherein the background mask is indicative of pixels that do not belong to identified target objects, and training the PointNet model with historical point cloud data to generate the pixel level instance segmentation output, wherein the pixel level instance segmentation output is indicative of identified target objects in the sensor image data. In other features, the method includes, for each of the identified target objects, generating a three-dimensional bounding box estimation output of the identified target object using the PointNet model.

In other features, the three-dimensional bounding box estimation output includes a position of the identified target object, a width of the identified target object, a length of the identified target object, and a height of the identified target object. In other features, the method includes generating a class semantic segmentation of objects according to the obtained sensor image data and combining the class semantic segmentation with the generated background mask of the convolutional neural network, to determine the point cloud data of the identified target objects to supply to the PointNet model.

In other features, the two-dimensional CNN includes a U-Net architecture, the U-Net architecture includes a contraction path including multiple convolutions each followed by a rectified linear unit (ReLU) and a max pooling operation, and spatial information is reduced while feature information is increased in the contracting path, and the U-Net architecture includes an expansion path configured to combine the feature information the spatial information though a sequence of up-convolutions and concatenations with high-resolution features from the contraction path.

In other features, the PointNet model is combined with a multilayer perceptron (MLP) model to generate the pixel level instance segmentation output of the identified target objects, and the MLP model is a fully connected feedforward artificial neural network (ANN). In other features, the obtained sensor image data includes ambient image data obtained by the SPAD Lidar sensor, intensity image data from a first echo group of the SPAD Lidar sensor, and depth image data from the first echo group of the SPAD Lidar sensor.

In other features, the PointNet model includes a classification network configured to take multiple points as input, apply input and feature transformations to the input, aggregate point features by max pooling, and output a classification score for multiple classes.

A computer system includes memory hardware configured to store a two-dimensional convolutional neural network (CNN) trained to generate a background mask by identifying target objects in obtained sensor image data and filtering out background pixels that do not belong to the identified target objects, a PointNet model trained to generate a pixel level instance segmentation output of the identified target objects based on point cloud data associated with the identified target objects, and computer-executable instructions. The system includes processor hardware configured to execute the instructions, wherein the instructions include obtaining sensor image data from photon detector of an SPAD Lidar sensor in communication with the processor hardware, supplying the obtained sensor image data to the trained two-dimensional CNN to generate a background mask by identifying target objects in the obtained sensor image data and filtering out background pixels that do not belong to the identified target objects, and supplying point cloud data of the identified target objects to a PointNet model to generate a pixel level instance segmentation output of the identified target objects.

In other features, the system includes the SPAD Lidar sensor, wherein the SPAD Lidar sensor is configured to obtain multiple return signals with a single laser pulse, capture infrared (IR) light to capture ambient scene illumination, and capture surface reflectance by measuring a strength of a detected laser pulse. In other features, supplying point cloud data of the identified target objects to the PointNet model includes supplying only point cloud data associated with the identified target objects, without supplying point cloud data associated with identified background pixels to the PointNet model.

In other features, the instructions further include training the two-dimensional CNN with historical sensor image data from SPAD Lidar sensors to generate the background mask, wherein the background mask is indicative of pixels that do not belong to identified target objects, and training the PointNet model with historical point cloud data to generate the pixel level instance segmentation output, wherein the pixel level instance segmentation output is indicative of identified target objects in the sensor image data. In other features, the instructions further include, for each of the identified target objects, generating a three-dimensional bounding box estimation output of the identified target object using the PointNet model.

In other features, the three-dimensional bounding box estimation output includes a position of the identified target object, a width of the identified target object, a length of the identified target object, and a height of the identified target object. In other features, the instructions further include generating a class semantic segmentation of objects according to the obtained sensor image data, and combining the class semantic segmentation with the generated background mask of the convolutional neural network, to determine the point cloud data of the identified target objects to supply to the PointNet model.

In other features, the two-dimensional CNN includes a U-Net architecture, the U-Net architecture includes a contraction path including multiple convolutions each followed by a rectified linear unit (ReLU) and a max pooling operation, and spatial information is reduced while feature information is increased in the contracting path, and the U-Net architecture includes an expansion path configured to combine the feature information the spatial information though a sequence of up-convolutions and concatenations with high-resolution features from the contraction path. In other features, the PointNet model is combined with a multilayer perceptron (MLP) model to generate the pixel level instance segmentation output of the identified target objects, and the MLP model is a fully connected feedforward artificial neural network (ANN).

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
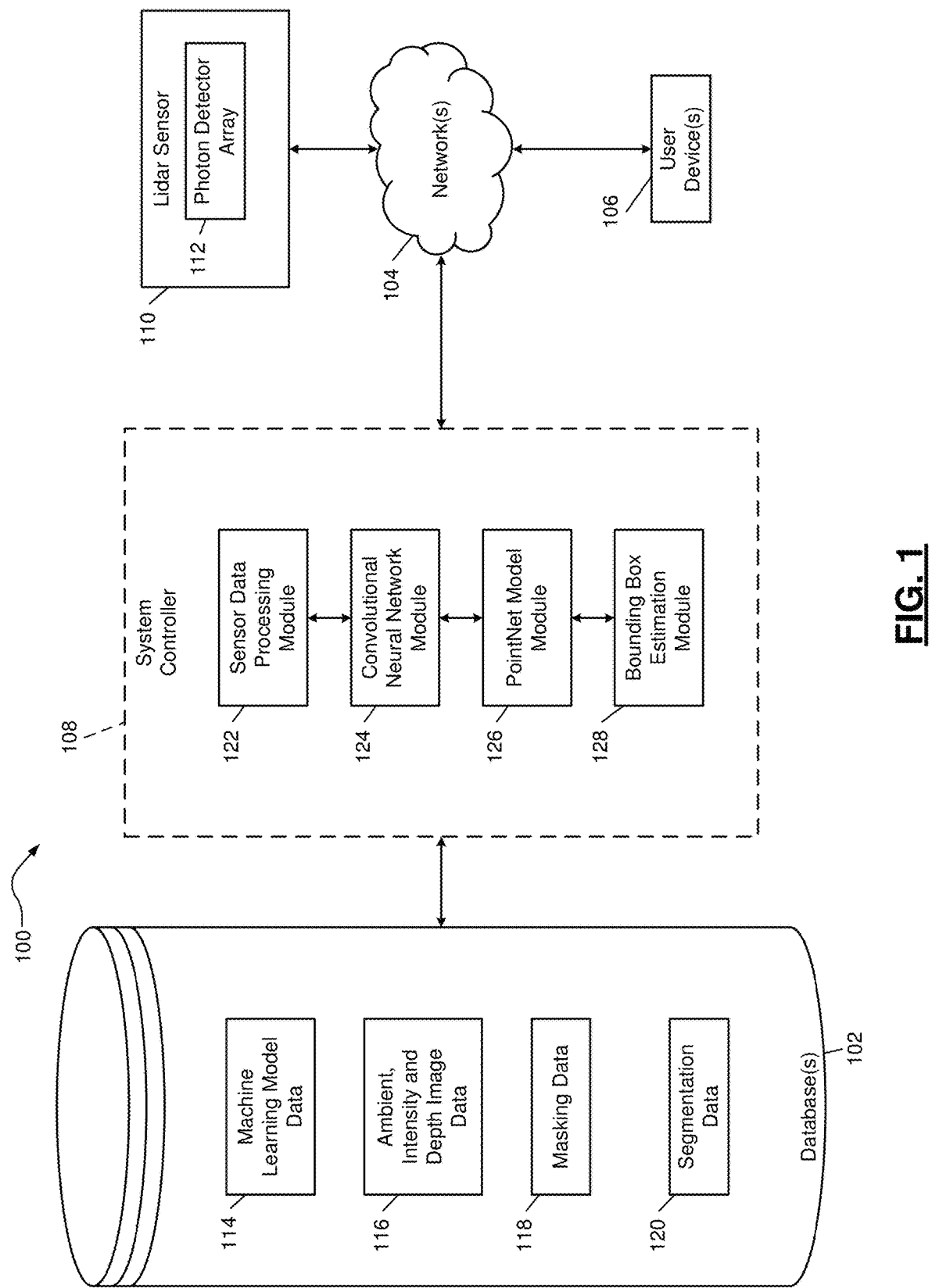
FIG. 1 is a functional block diagram of an example system for instance segmentation using SPAD Lidar and machine learning models.

In some example embodiments described herein, ambient and point cloud data from a single-photon avalanche diode (SPAD) Lidar system can be used to achieve both accurate instance segmentation for a 2D ambient image and an accurate 3D bounding box for a point cloud. Traditionally, convolutional neural network (CNN) systems work better for 2D images, while point net is more suitable for a 3D point clouds. By combining the advantages of both systems, the systems and methods of the present disclosure utilize a new network structure suitable for both tasks.

For example, a U-Net variant network to train semantic tasks for the network on the ambient, intensity, and depth image of a SPAD Lidar as it works best on image-like tasks. U-Net is based on a fully convolutional neural network developed for biomedical image segmentation and supplements a usual contracting network by successive layers, where pooling operations are replaced by up-sampling operators. The systems and methods of the present disclosure use this 2D CNN as a filter to filter out non-target object points. The remaining points are then sent to PointNet and MLP network to do the instance segmentation task and raw bounding box estimation. PointNet is a neural-network based system that consumes point clouds, respects permutation invariance of points in the input, and provides a unified architecture for applications ranging from object classification, part segmentation, to scene semantic parsing. MLP network is a multilayer perceptron network that is a fully connected class of feedforward artificial neural network. Finally, segmented object points and roughly estimated points are sent to the last network to refine its bounding box one-by-one.

In some approaches, both ambient and point clouds are trained with ground truth box labels only. In contrast, in some example embodiments described herein, an ambient image is trained with semantic label first to filter out the invalid and non-target points, and then a second network is used to predict object points for each object and estimate a rough box for each object.

LiDAR is a powerful sensor which has the ability to capture a wide range measurements for perception tasks including object detection. The most commonly used LiDAR measurement type is a set of 3D points (a point cloud) and their reflectance values, which provides accurate 3D shape information of objects in the scene. State-of-the-art object detection methods have made great breakthroughs by leveraging 3D point cloud data. However, despite such success, there are several types of LiDAR measurements which are largely ignored in modern day LiDAR perception algorithms.

In various implementations, three unique features of the LiDAR sensor may be used for LiDAR-based object detection algorithms, to greatly improve 3D object detection performance. A first important feature of LiDAR is its ability to obtain multiple return signals with a single laser pulse, called echoes. LiDAR is a time-of-flight measurement system which measures the time it takes for a laser pulse to hit an object and return to the sensor. More specifically, the laser emits a short pulse, and a photodetector timestamps the arrival of photons reflected back by object surfaces.

It is possible for a photodetector to acquire multiple return signals (echoes) if the laser is partially reflected by multiple objects along its path of propagation. We call the multiple returned signals generated from the same laser beam an 'echo group.' Points in the same echo group lie on one line in 3D space, and they are typically ordered according to their signal strength.

In addition to the direct benefit of increasing the number of points available, multiple echoes also imply that the laser signal is only partially reflected at non-terminal echo locations. Thus, these echo points are likely on the contour of an object (it obstructs only a part of the laser) or on a semi-transparent surface (a portion of the laser propagates through the surface). Therefore the echoes may encode meaningful features that can help locate or classify an object.

Another important feature of LiDAR is the ability to capture ambient scene illumination. The photodetector of the LiDAR continuously captures infrared (IR) light and therefore is capturing IR images of the scene (typically reflected sunlight) between laser pulses. Although this information is typically ignored in most LiDAR based perception algorithms, a LiDAR can be used to capture an image of the scene using the IR spectrum. Ambient measurements can be processed as a 2D image and can be used to extract texture information about the objects in the scene.

A third important features of LiDAR is the ability to capture surface reflectance. LiDAR captures laser signal returns, so each point will have a corresponding reflectance value which measures the strength of the detected laser pulse. Reflectance also encodes material properties of objects useful for detection and classification. Unlike the ambient signal, different points inside the same echo group will have different reflectance values, resulting in multiple reflectance intensity values which we call multi-echo reflectance.

SPAD Lidar Image Segmentation System

FIG. 1 is a functional block diagram of an example system 100 for instance segmentation using SPAD Lidar and machine learning models, which includes a database 102. While the system 100 is generally described as being deployed in a computer network system, the database 102 and/or components of the system 100 may otherwise be deployed (for example, as a standalone computer setup). The system 100 may include a desktop computer, a laptop computer, a tablet, a smartphone, etc.

As shown in FIG. 1, the database 102 stores machine learning model data 114, ambient, intensity and depth image data 116, masking data 118 and segmentation data 120. In various implementations, the database 402 may store other types of data as well. The machine learning model data 114, ambient, intensity and depth image data 116, masking data 118 and segmentation data 120 may be located in different physical memories within the database 102, such as different random access memory (RAM), read-only memory (ROM), a non-volatile hard disk or flash memory, etc. In some implementations, the machine learning model data 114, ambient, intensity and depth image data 116, masking data 118 and segmentation data 120 may be located in the same memory (such as in different address ranges of the same memory). In various implementations, the machine learning model data 114, ambient, intensity and depth image data 116, masking data 118 and segmentation data 120 may each be stored as structured or unstructured data in any suitable type of data store.

The machine learning model data 114 includes data describing any suitable suitable machine learning models for use in instance segmentation using SPAD Lidar, including those described herein. For example, the machine learning model data 114 may include a two-dimensional convolution neural network (CNN) (such as a U-Net architecture), a PointNet model, a multilayer perceptron, etc.

The machine learning model data 114 may include historical data inputs for training the machine learning models. For example, the machine learning model data 114 may include historical sensor image data from SPAD Lidar sensors for training a two-dimensional (2D) CNN to generate a background mask, historical point cloud data for training a PointNet model to generate a pixel level instance segmentation output, etc.

The ambient, intensity and depth image data 116 may include any suitable data obtained from a sensor array of a Lidar detector (such as a SPAD Lidar detector), processed data associated with a Lidar detector, etc. For example, ambient image data may be obtained based on IR data captured by the Lidar detector, intensity and depth image data may be obtained based on echo groups of the Lidar detector (such as a first echo group), etc.

The masking data 118 may include any suitable data identifying a background of sensor image data from a Lidar detector, target objects in sensor image data from the Lidar detector, pixels corresponding to the identified background and/or target objects, etc. For example, a 2D CNN may be trained to generate a background mask that identifies target objects in sensor image data from the Lidar sensor.

The segmentation data 120 may include any suitable data for providing an instance segmentation output based on sensor data from a Lidar detector. For example, a PointNet model may be trained to generate an instance segmentation output based on point cloud data that corresponds only to identified target objects (such as point cloud data where background pixels have been removed based on, e.g., a background mask generated by the 2D CNN).

As shown in FIG. 1, the system controller 108 may include one or more modules, including a sensor data processing module 122, a convolutional neural network module 124, a PointNet model module 126, and a bounding box estimation module 126.

The sensor data processing module 122 may be configured to process sensor data from the Lidar sensor 110. For example, the Lidar sensor 110 may include one or more photon detector arrays, configured to detect Lidar sensor data. In various implementations, the Lidar sensor 110 may be a single-photon avalanche diode (SPAD) Lidar system.

FIG. 1 illustrates the Lidar sensor 110 as communicating with the system controller 108 through one or more networks. Example networks may include a wireless network, a local area network (LAN), the Internet, a cellular network, etc. In other embodiments, the Lidar sensor 110 may be directly connected with the system controller 108, may be considered as a part of system controller 108, etc.

In various implementations, a system administrator may generate or modify the machine learning models by accessing the system controller 108 via the user device 106. The user device 106 may include any suitable user device for displaying text and receiving input from a user, including a desktop computer, a laptop computer, a tablet, a smartphone, etc. In various implementations, the user device 106 may access the database 102 or the system controller 108 directly, or may access the database 102 or the system controller 108 through one or more networks 104. Example networks may include a wireless network, a local area network (LAN), the Internet, a cellular network, etc.

The system controller 108 includes a convolutional neural network module 124. The convolutional neural network module 124 may include any suitable convolutional neural network, including a two-dimensional CNN such as, for example, a U-Net architecture model as described further below with reference to FIG. 5.

The system controller 108 includes a PointNet model module 126. The PointNet model module may include any suitable model for processing point cloud data, such as point cloud data generated based on signals detected by the photon detector array of the Lidar sensor 110.

In various implementations, the PointNet model may include a deep net architecture that consumes a raw point cloud (e.g., a set of points) without voxelization or rendering. It is a unified architecture that learns both global and local point features, providing a simple, efficient and effective approach for a number of 3D recognition tasks.

In various implementations, the PointNet model may use a single symmetric function, max pooling. The network may learn a set of optimization functions/criteria that select interesting or informative points of the point cloud and encode the reason for their selection. The final fully connected layers of the network may aggregate the learned optimal values into the global descriptor for the entire shape (e.g., shape classification) or may be used to predict per point labels (e.g., shape segmentation).

The input format of the PointNet model may be easy to apply rigid or affine transformations to, as each point transforms independently. Therefore, it may be possible to add a data-dependent spatial transformer network that attempts to canonicalize the data before the PointNet processes them, to further improve the results.

The system controller 108 includes a bounding box estimation module 128. For example, the bounding box estimation module may be used to estimate bounding boxes for each identified target object of the output of the PointNet model. The bounding boxes may be three-dimensional (3D), and may include a position of each identified target object, a length of each target object, a width of each target object, a height of each target object, etc.

Figure 2:
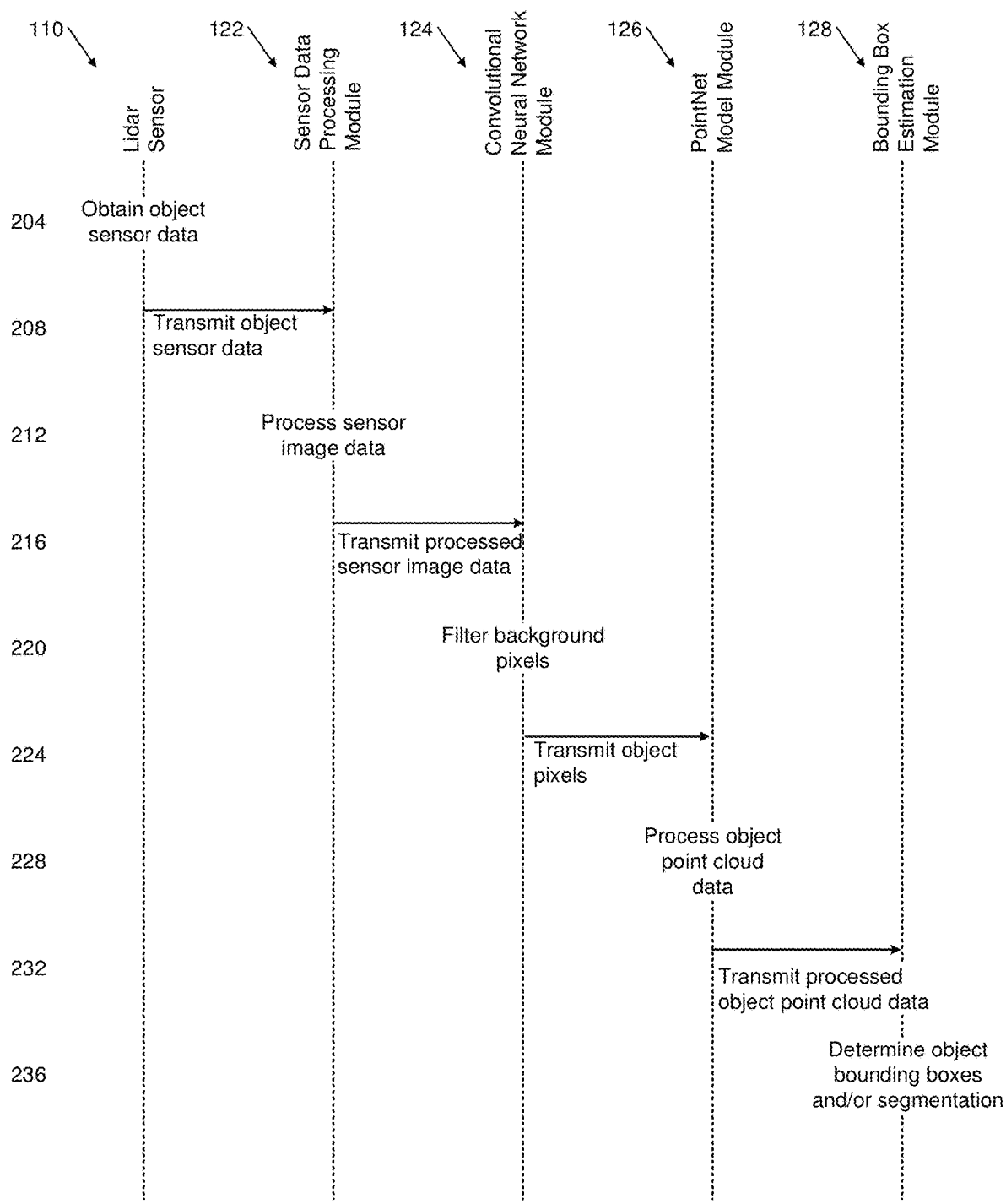
FIG. 2 is a message sequence chart illustrating example relationships between components of the system of FIG. 1.

FIG. 2 is a message sequence chart illustrating example interactions between the Lidar sensor 110, the sensor data processing module 122, the convolutional neural network module 124, the PointNet model module 126, and the bounding box estimation module 128.

At line 204, the Lidar sensor obtains object sensor data (such as via the photon sensor array 112 of the Lidar sensor 110 of FIG. 1). The obtained object sensor data is then transmitted to the sensor data processing module 122 at line 208.

The sensor processing data module 122 processes the sensor image data at line 212. For example, the sensor data processing module 122 may generate ambient image data, intensity data, depth data, etc., based on the obtained object sensor data from the Lidar sensor 110.

At line 216, the sensor processing data module 122 transmits the processed sensor image data to the convolutional neural network module 124. The convolutional neural network module 124 then filters background pixels at line 220. For example, the convolutional neural network module 124 may generate a background mask that filters out pixels which do not belong to identified target objects.

The convolutional neural network module 124 transmits the object pixels to the PointNet model module 126, at line 224. For example, the object pixels may specify which point cloud data points should be supplied to the PointNet model. Therefore, the PointNet model may receive only input points of the point cloud data that correspond to identified target objects, while leaving out pixels corresponding to background portions of the sensor data obtained from the Lidar sensor.

At line 232, the PointNet model module 126 transmits the processed object point cloud data to the bounding box estimation module 128. The bounding box estimation module determines an estimated bounding box for each identified target object and/or instance segmentation for the identified target objects. Although FIG. 2 illustrates the bounding box estimation module 128 as performing bounding box estimation and/or instance segmentation, in other embodiments the bounding box estimation and/or instance segmentation may be an output of the PointNet model, may be performed by another module, etc.

Figure 3:
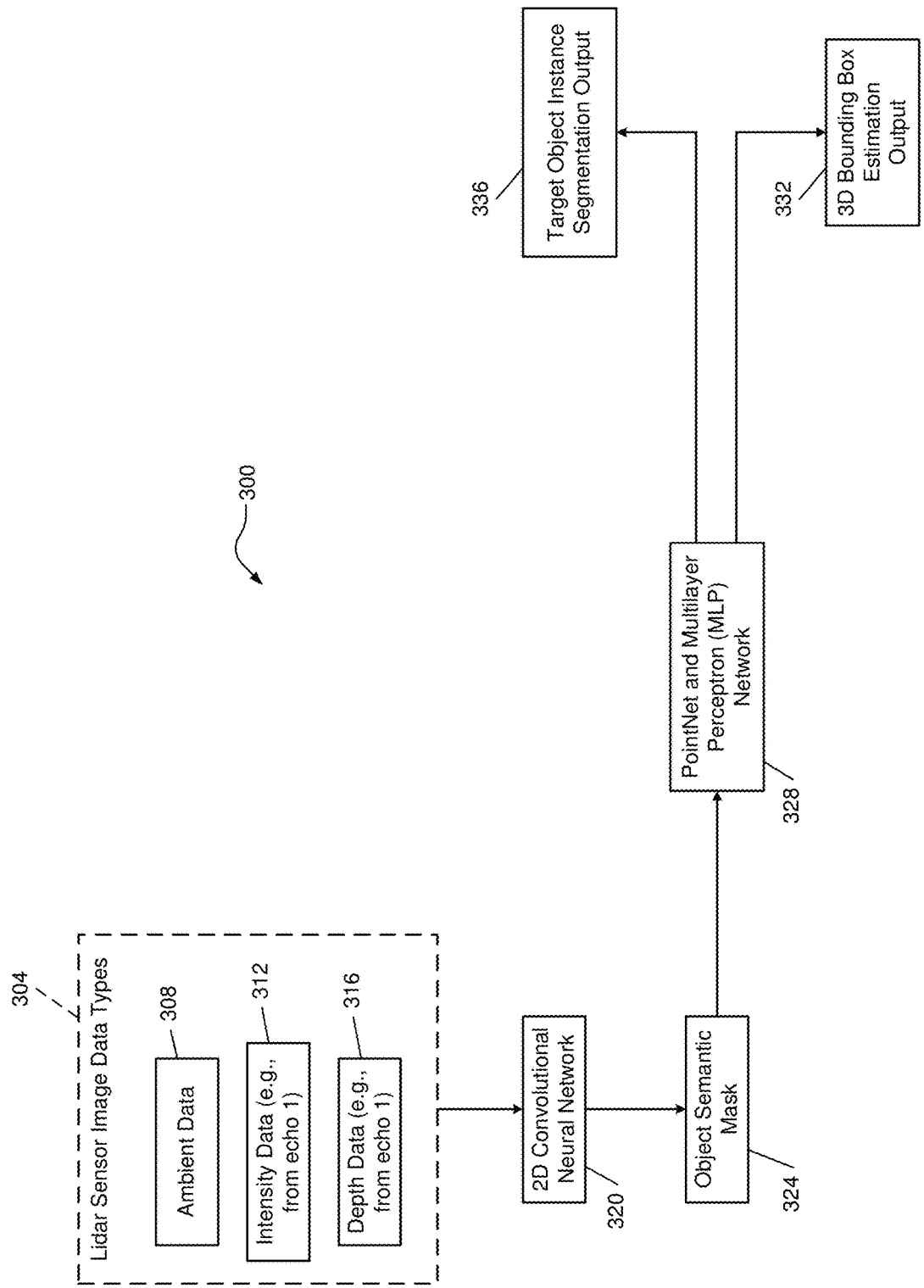
FIG. 3 is a functional block diagram of another example system for instance segmentation using SPAD Lidar and machine learning models.

FIG. 3 is a functional block diagram of another example system 300 for instance segmentation using SPAD Lidar and machine learning models. As shown in FIG. 3, Lidar sensor image data types 304 may include various aspects of sensor data captured by the Lidar sensor 110, such as ambient data 308, intensity data 312, and depth data 316.

The ambient data 308, intensity data 312 and depth data 316 may include processed sensor data from the Lidar sensor 110, and may be in a two-dimensional format for input to the 2D convolutional neural network. The intensity data 312 and depth data 316 may be determined based on, e.g., a first echo group of the Lidar sensor data.

The 2D convolutional neural network 320 is configured to generate a background mask that identifies which pixels belong to identified target objects, and which pixels of the Lidar sensor data correspond to unimportant background. An example U-Net architecture for the 2D CNN 320 is described further below with reference to FIG. 5.

The 2D CNN 320 may output an object semantic mask 324 to identify the target objects. The object semantic mask 324 is then used for input to a PointNet and Multilayer Perceptron (MLP) Network 328. For example, the object semantic mask 324 may identify which points of point cloud data associated with the Lidar sensor correspond to target objects, such that only the identified points associated with the target objects are input to the PointNet and Multilayer Perceptron (MLP) Network 328.

The PointNet and Multilayer Perceptron (MLP) Network 328 may be configured to provide outputs, or the output of the PointNet and Multilayer Perceptron (MLP) Network 328 may be used to generate multiple instance segmentations. For example, the output of the PointNet and Multilayer Perceptron (MLP) Network 328 may be used to generate a target object instance segmentation output 336, may be used for a 3D bounding box estimation output 332 that estimates a bounding box for each identified target object, etc.

In the example embodiments described in FIG. 3, and FIG. 4 below, a 2D CNN such as a U-Net architecture may be used to train a semantic task on ambient, intensity and depth image information from a SPAD Lidar detector. The U-Net architecture is used to filter out non-target points.

The remaining points are then sent to a PointNet and MLP network to perform instance segmentation and raw bounding box estimation. Segmented object points and roughly estimated points may then be sent to another network to refine each bounding box individually. In other words, an ambient image model may be trained first with sematic labels to filter out invalid and non-target points, and then a second network is used to predict points for each object and estimate a rough box for each object.

Figure 4:
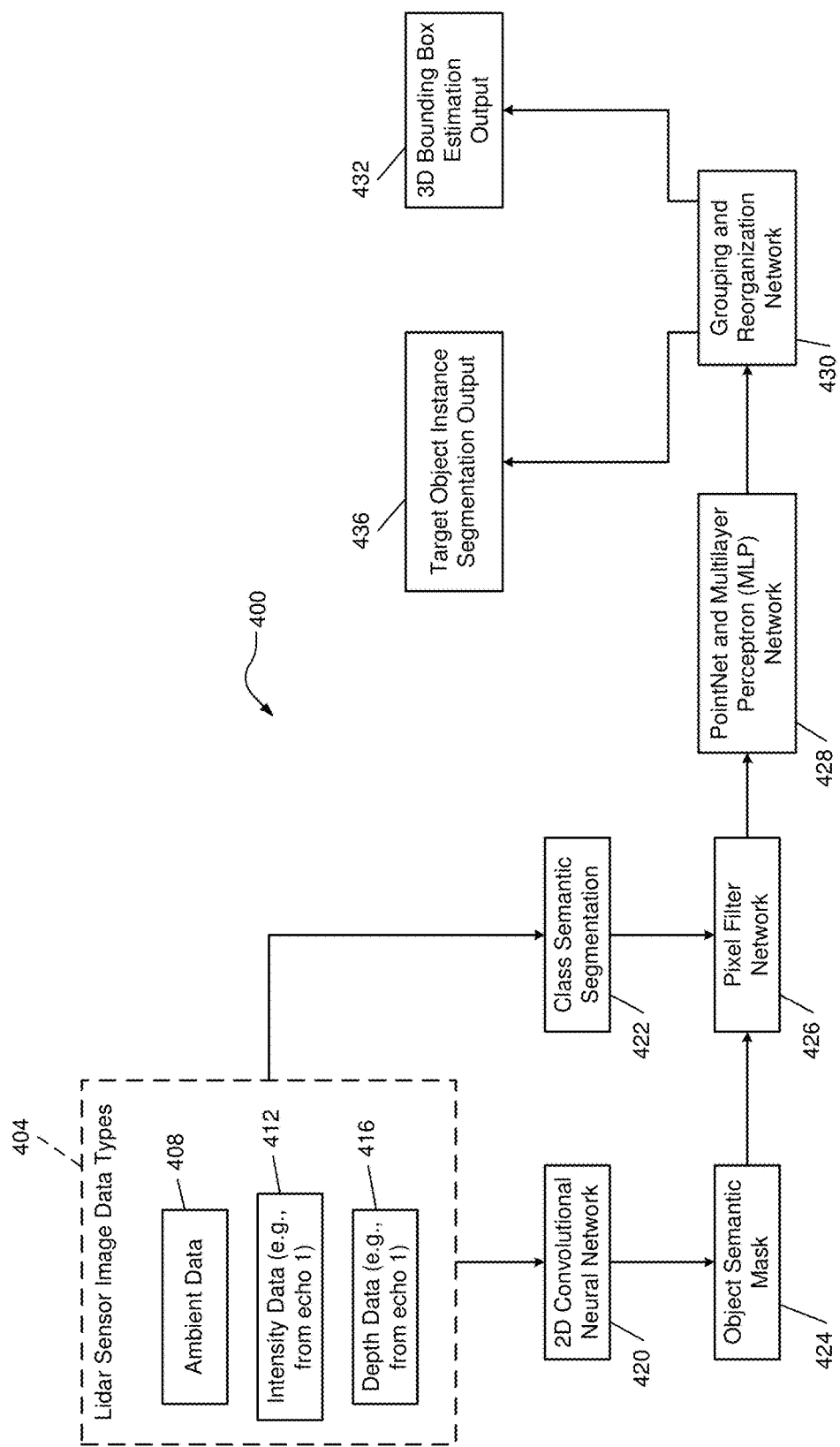
FIG. 4 is a functional block diagram of yet another instance segmentation using SPAD Lidar and machine learning model.

FIG. 4 is a functional block diagram of another example system 400 for instance segmentation using SPAD Lidar and machine learning models. The system 400 may be similar to the system 300 of FIG. 4, with some additional components.

As shown in FIG. 4, Lidar sensor image data types 404 may include various aspects of sensor data captured by the Lidar sensor 110, such as ambient data 408, intensity data 412, and depth data 416. The ambient data 408, intensity data 412 and depth data 416 may be in a two-dimensional format for input to the 2D convolutional neural network 420.

The 2D convolutional neural network 420 is configured to generate a background mask that identifies which pixels belong to identified target objects, and which pixels of the Lidar sensor data correspond to unimportant background. The 2D CNN 420 may output an object semantic mask 424 to identify the target objects.

The ambient data 408, intensity data 412 and depth data 416 may be used to generate a class semantic segmentation 422. The class semantic segmentation 422 may be combined with the object semantic mask 424 using a pixel filter network. For example, the class semantic segmentation 422 may be combined with the object semantic mask 424 using an AND operation, to generate input to a PointNet and Multilayer Perceptron (MLP) Network 428.

In various implementations, the object semantic mask 424 combined with the class semantic segmentation 422 may identify which points of point cloud data associated with the Lidar sensor correspond to target objects, such that only the identified points associated with the target objects are input to the PointNet and Multilayer Perceptron (MLP) Network 428.

The PointNet and Multilayer Perceptron (MLP) Network 428 may be configured to provide outputs, or the output of the PointNet and Multilayer Perceptron (MLP) Network 428 may be used to generate multiple instance segmentations. For example, the output of the PointNet and Multilayer Perceptron (MLP) Network 428 may go to a grouping and reorganization network 430, which is used to generate a target object instance segmentation output 436, may be used for a 3D bounding box estimation output 432 that estimates a bounding box for each identified target object, etc.

Example Machine Learning Models

Figure 5:
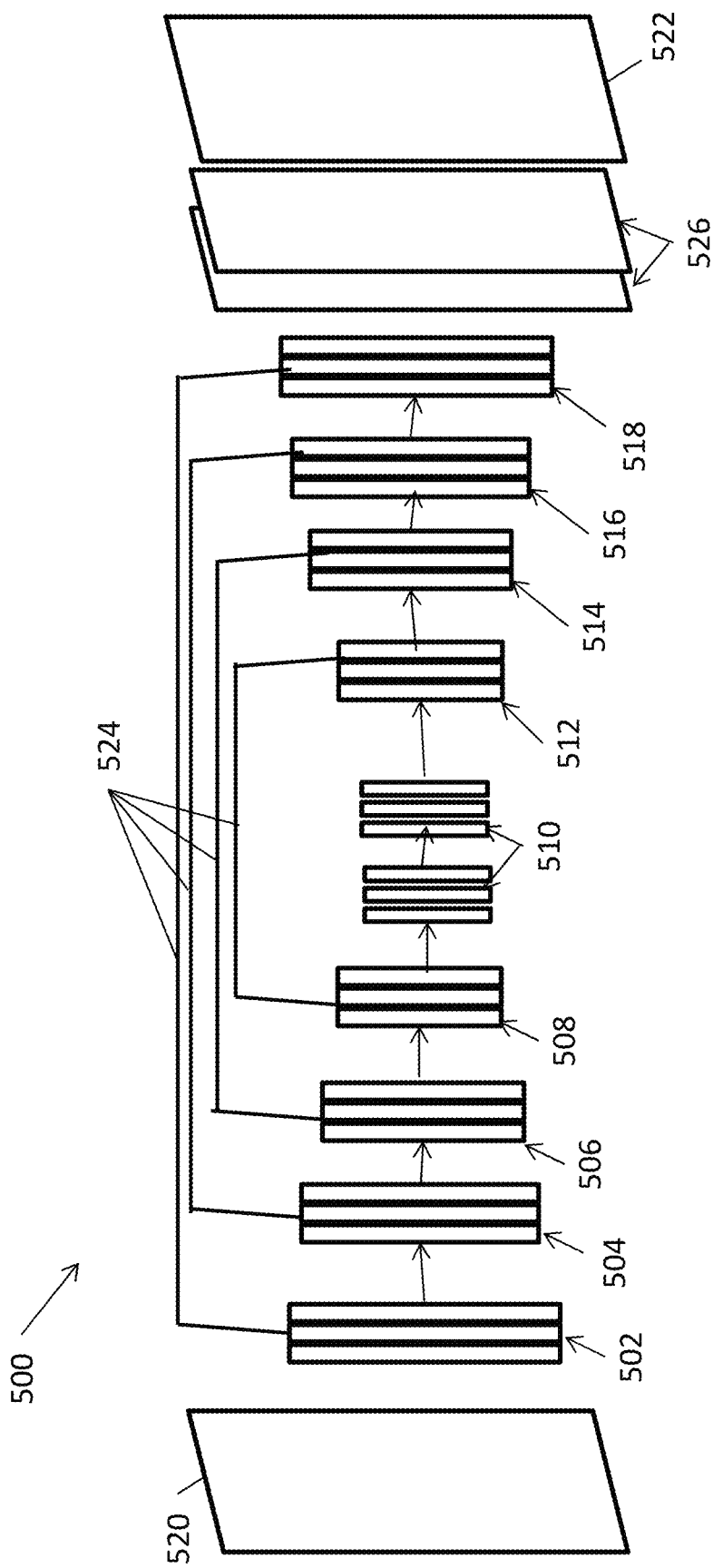
FIG. 5 is a block diagram of an example architecture of a U-Net machine learning model.

FIG. 5 illustrates an example U-Net machine learning model architecture 500, which may be used in an instance segmentation system that uses SPAD Lidar, including the example embodiments described herein (such as the 2D CNNs 320 and 420).

The UNet convolutional neural network was developed for biomedical image segmentation. The UNet convolutional neural network receives either a gray or color images as inputs, and outputs an image including a segmentation mask (e.g., for edge detection, object classification, etc.). An example UNet convolutional neural network is described in *U-Net: Convolutional Networks for Biomedical Image Segmentation*, published May 18, 2015 by Olaf Ronneberger, Philipp Fischer, and Thomas Brox, Computer Science Department and BIOSS Centre for Biological Signaling Studies, University of Freiburg, Germany.

As shown in FIG. 5, the U-Net model architecture 500 includes multiple encoder down-sampling blocks 502, 504, 506 and 508, and multiple decoder up-sampling blocks 512, 514, 516 and 518. The encoder down-sampling blocks 502, 504, 506 and 508 are connected sequentially, with the encoder block 502 arranged to receive an input, process the input, and supply a processed input to the encoder block 504. The encoder block 504 is arranged to receive the input processed by encoder block 502, further process the input, and supply the further processed input to encoder block 506. This is further repeated with encoder blocks 506 and 508. Optional center block(s) 510 may be positioned between the last encoder block 508 and the first decoder block 512.

The decoder up-sampling blocks 512, 514, 516 and 518 are also connected sequentially, with the decoder block 512 arranged to receive a processed input from the optional center block(s) 510 or the last encoder block 508, process the received input, and supply a processed input to decoder block 514. The decoder block 514 is arranged to receive the input processed by decoder block 512, further process the received input, and supply the further processed input to decoder block 516. This is further repeated with decoder blocks 516 and 518.

The U-Net model architecture 500 is configured to generate an output 522 including at least one segmentation classification. For example, the output may include a first dimension, a second dimension, and a plurality of channels (e.g., a multi-channel input). The output may include one or more segmentation classifications (e.g., a multi-class output) corresponding to the input.

As shown in FIG. 5, the U-Net model architecture 500 includes optional skip connections 524. The optional skip connections 524 may concatenate corresponding ones of the encoder down-sampling blocks and the decoder up-sampling blocks (e.g., encoder and decoder blocks at the same level in the down-sampling and up-sampling sequences, etc.). The skip connections may allow for finer (e.g., improved) information recovery during the up-sampling portion of the U-Net model architecture 500.

FIG. 5 illustrates four encoder down-sampling blocks 502, 504, 506 and 508, and four decoder up-sampling blocks 512, 514, 516 and 518. In other embodiments, the U-Net model architecture 500 may include more or less encoder blocks and decoder blocks. For example, some learning networks might not include any up-sampling blocks (e.g., when the learning network is used only to detect that a signal is present or not present, etc.).

Each block may include any suitable learning network convolution block, such as a Residual Network (ResNet) Basic block, a ResNet Bottleneck block, a simple two convolution block, a Dense Convolutional Network (DenseNet) block, a ResNeXt block, etc. In some embodiments, the RexNeXt Bottleneck and ResNet Basic blocks may provide improved accuracy compared to other block types.

For example, each encoder down-sampling block 502, 504, 506 and 508, and each decoder up-sampling block 512, 514, 516 and 518, may include at least two convolution (e.g., neural network) layers, and one or more non-linear rectification layers. The encoder blocks 502, 504, 506 and 508 may include a down-sampling layer, and the decoder blocks 512, 514, 516 and 518 may include an up-sampling layer (e.g., a transposed convolution up-sampling layer).

Figure 6A:
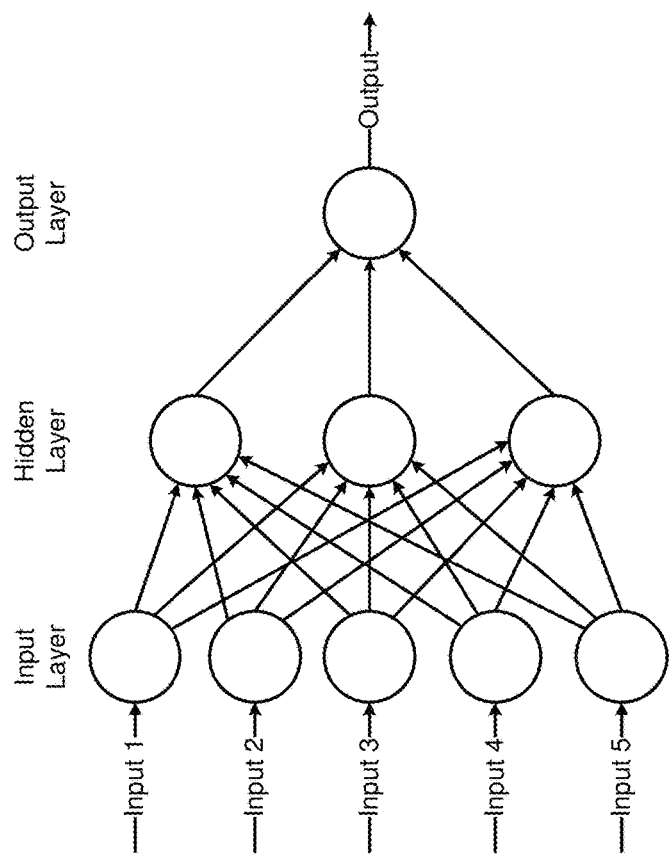
FIGS. 6A and 6B are graphical representations of example neural networks for instance segmentation using SPAD Lidar.
Figure 6B:
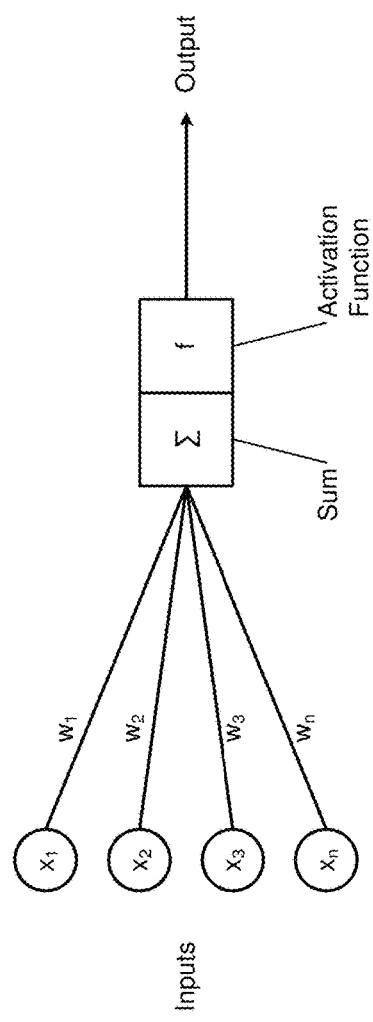
Figure 7:
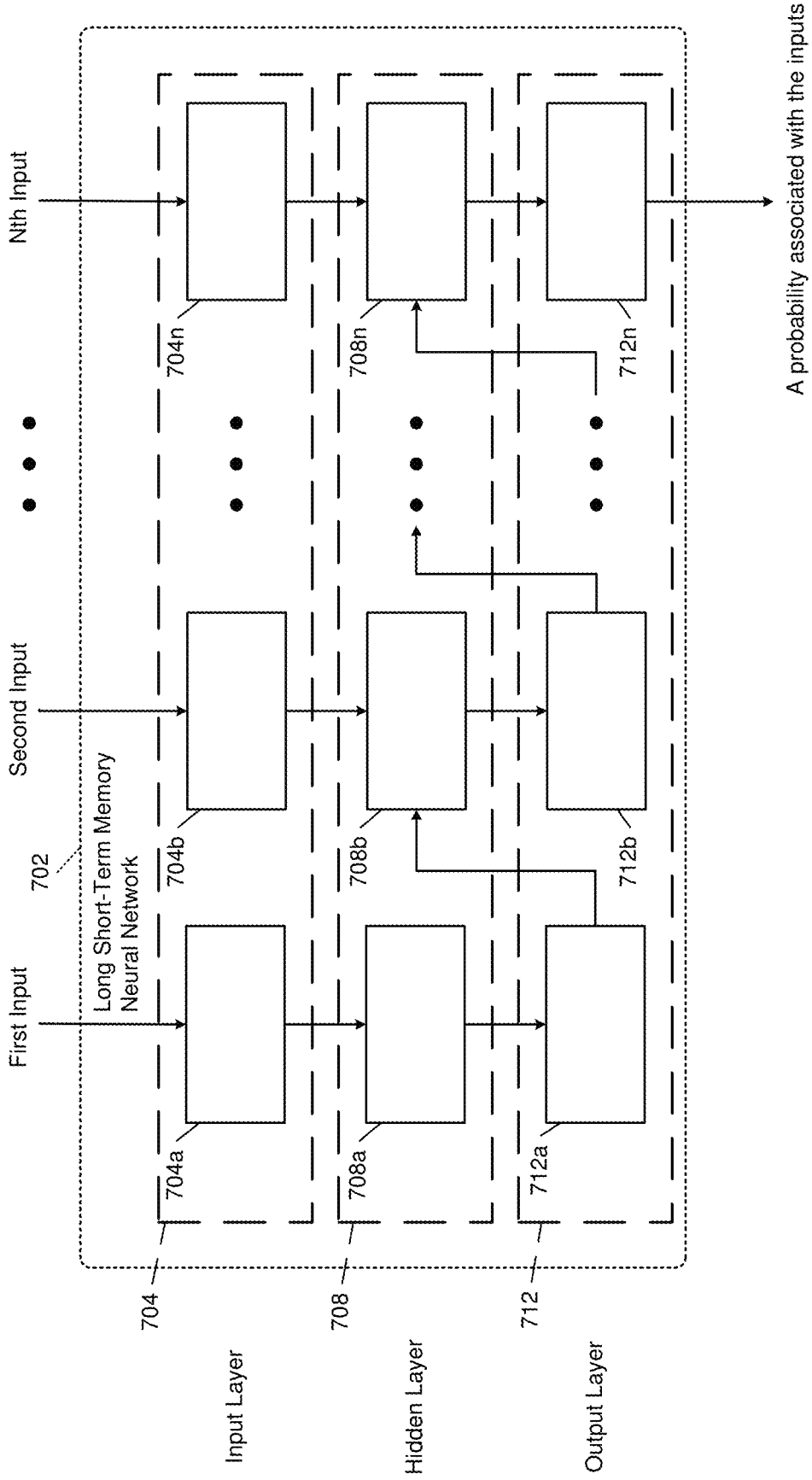
FIG. 7 is a graphical representation of layers of an example long short-term memory (LSTM) machine learning model.
Figure 8:
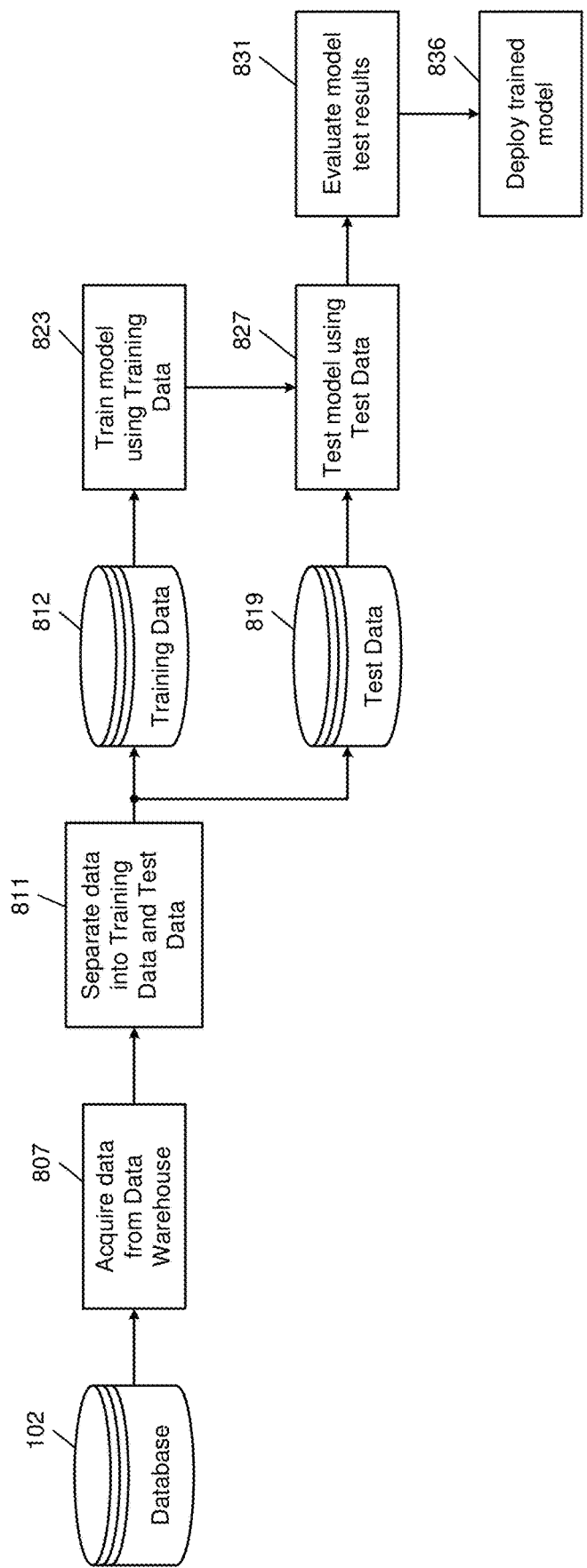
FIG. 8 is a flowchart illustrating an example process for training a machine learning model.

FIGS. 6-8 illustrate other example machine learning model details, which may be used with, for example, the systems 100, 300 and 400 (e.g., to train or implement the 2D CNN or the PointNet and MLP network). FIG. 6A shows a fully connected neural network, where each neuron in a given layer is connected to each neuron in a next layer. In the input layer, each input node is associated with a numerical value, which can be any real number. In each layer, each connection that departs from an input node has a weight associated with it, which can also be any real number (see FIG. 6B). In the input layer, the number of neurons equals number of features (columns) in a dataset. The output layer may have multiple continuous outputs.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layers can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause underfitting (inability to adequately capture signals in dataset) or over-fitting (insufficient information to train all neurons; network performs well on training dataset but not on test dataset).

Various methods and criteria can be used to measure performance of a neural network model. For example, root mean squared error (RMSE) measures the average distance between observed values and model predictions. Coefficient of Determination ($R^2$) measures correlation (not accuracy) between observed and predicted outcomes. This method may not be reliable if the data has a large variance. Other performance measures include irreducible noise, model bias, and model variance. A high model bias for a model indicates that the model is not able to capture true relationship between predictors and the outcome. Model variance may indicate whether a model is stable (a slight perturbation in the data will significantly change the model fit).

FIG. 7 illustrates an example of a long short-term memory (LSTM) neural network used to generate models such as those described above, using machine learning techniques. FIG. 7 is a functional block diagram of a generic example LSTM neural network 702. The generic example LSTM neural network 702 may be used to implement a machine learning model, and various implementations may use other types of machine learning networks. The LSTM neural network 702 includes an input layer 704, a hidden layer 708, and an output layer 712. The input layer 704 includes inputs 704a, 704b ... 704n. The hidden layer 708 includes neurons 708a, 708b ... 708n. The output layer 712 includes outputs 712a, 712b ... 712n.

Each neuron of the hidden layer 708 receives an input from the input layer 704 and outputs a value to the corresponding output in the output layer 712. For example, the neuron 708a receives an input from the input 704a and outputs a value to the output 712a. Each neuron, other than the neuron 708a, also receives an output of a previous neuron as an input. For example, the neuron 708b receives inputs from the input 704b and the output 712a. In this way, the output of each neuron is fed forward to the next neuron in the hidden layer 708. The last output 712n in the output layer 712 outputs a probability associated with the inputs 704a-704n. Although the input layer 704, the hidden layer 708, and the output layer 712 are depicted as each including three elements, each layer may contain any number of elements.

In various implementations, each layer of the LSTM neural network 702 must include the same number of elements as each of the other layers of the LSTM neural network 702. In some embodiments, a convolutional neural network may be implemented. Similar to LSTM neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 704a is connected to each of neurons 708a, 708b ... 708n.

In various implementations, each input node in the input layer may be associated with a numerical value, which can be any real number. In each layer, each connection that departs from an input node has a weight associated with it, which can also be any real number. In the input layer, the number of neurons equals number of features (columns) in a dataset. The output layer may have multiple continuous outputs.

As mentioned above, the layers between the input and output layers are hidden layers. The number of hidden layers can be one or more (one hidden layer may be sufficient for many applications). A neural network with no hidden layers can represent linear separable functions or decisions. A neural network with one hidden layer can perform continuous mapping from one finite space to another. A neural network with two hidden layers can approximate any smooth mapping to any accuracy.

FIG. 8 illustrates an example process for generating a machine learning model. At 807, control obtains data from a data warehouse, such as a database 102. The data may include any suitable data for developing machine learning models.

At 811, control separates the data obtained from the database 102 into training data 815 and test data 819. The training data 815 is used to train the model at 823, and the test data 819 is used to test the model at 827. Typically, the set of training data 815 is selected to be larger than the set of test data 819, depending on the desired model development parameters. For example, the training data 815 may include about seventy percent of the data acquired from the database 802, about eighty percent of the data, about ninety percent, etc. The remaining thirty percent, twenty percent, or ten percent, is then used as the test data 819.

Separating a portion of the acquired data as test data 819 allows for testing of the trained model against actual output data, to facilitate more accurate training and development of the model at 823 and 827. The model may be trained at 823 using any suitable machine learning model techniques, including those described herein, such as random forest, generalized linear models, decision tree, and neural networks.

At 831, control evaluates the model test results. For example, the trained model may be tested at 827 using the test data 819, and the results of the output data from the tested model may be compared to actual outputs of the test data 819, to determine a level of accuracy. The model results may be evaluated using any suitable machine learning model analysis, such as the example techniques described further below.

After evaluating the model test results at 831, the model may be deployed at 835 if the model test results are satisfactory. Deploying the model may include using the model to make predictions for a large-scale input dataset with unknown outputs. If the evaluation of the model test results at 831 is unsatisfactory, the model may be developed further using different parameters, using different modeling techniques, using other model types, etc.

Figure 9:
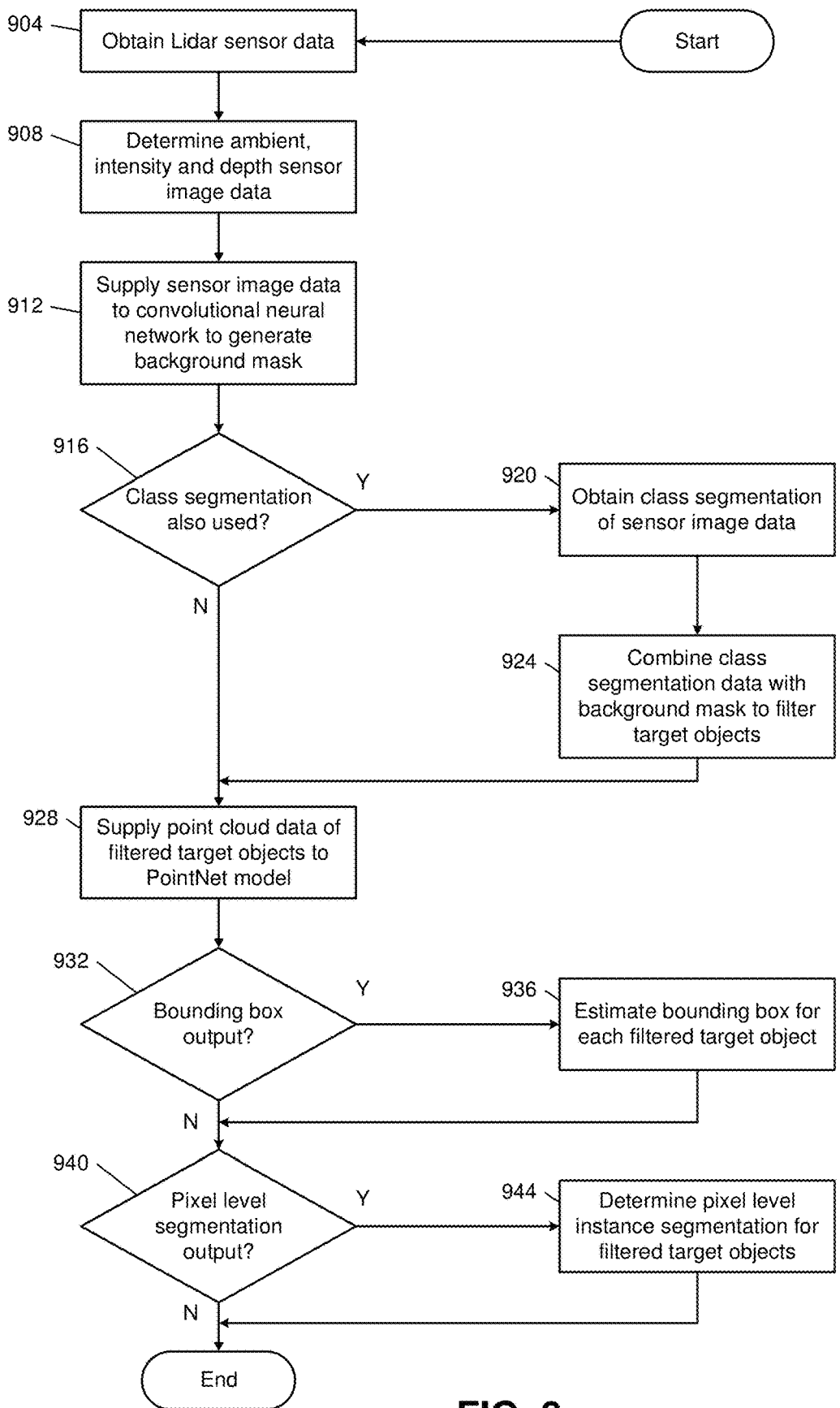
FIG. 9 is a flowchart depicting an example process for instance segmentation using SPAD Lidar and machine learning models.

FIG. 9 is a flowchart depicting an example process for instance segmentation using SPAD Lidar and machine learning models. Control begins at 904 by obtaining Lidar sensor data. For example, sensor data may be obtained from the Lidar sensor 110 of FIG. 1.

At 908, control determines ambient, intensity and depth information based on the sensor data obtained from the Lidar sensor at 904. Control then supplies the sensor image data to a convolutional neural network (such as the 2D CNNs 320 and 420), at 912. The sensor image data is supplied to the CNN to generate a background mask, which identifies target objects in the sensor data.

At 916, control determines whether class segmentation will also be used. For example, an output of the CNN may not include class information. If control determines at 916 that class segmentation will be used, control proceeds to 920 to obtain a class segmentation for the sensor image data.

The obtained class segmentation is then combined with the background mask at 924, to filter target objects. After combining the class segmentation with the background mask at 924, or after determining at 916 that class segmentation will not be used, control proceeds to 928 to supply point cloud data of the filtered target objects to a PointNet model (such as the PointNet and MLP models 328 and 428 of FIGS. 3 and 4).

At 932, control determines whether a bounding box output will be provided. If so, control estimates a bounding box for each filtered target object at 936. In some example embodiments, another network may be used to refine rough bounding boxes generated at 936. At 940, control determines whether pixel level segmentation will be output. If so, control proceeds to 944 to determine a pixel level instance segmentation for the filtered target object.

Conclusion

A computerized method for instance segmentation using single-photon avalanche diode (SPAD) light detection and ranging (Lidar) includes obtaining sensor image data from photon detector of an SPAD Lidar sensor, supplying the obtained sensor image data to a two-dimensional convolutional neural network (CNN) to generate a background mask by identifying target objects in the obtained sensor image data and filtering out background pixels that do not belong to the identified target objects, and supplying point cloud data of the identified target objects to a PointNet model to generate a pixel level instance segmentation output of the identified target objects.

In other features, the Lidar sensor is configured to obtain multiple return signals with a single laser pulse, capture infrared (IR) light to capture ambient scene illumination, and capture surface reflectance by measuring a strength of a detected laser pulse. In other features, supplying point cloud data of the identified target objects to the PointNet model includes supplying only point cloud data associated with the identified target objects, without supplying point cloud data associated with identified background pixels to the PointNet model.

In other features, the method includes training the two-dimensional CNN with historical sensor image data from SPAD Lidar sensors to generate the background mask, wherein the background mask is indicative of pixels that do not belong to identified target objects, and training the PointNet model with historical point cloud data to generate the pixel level instance segmentation output, wherein the pixel level instance segmentation output is indicative of identified target objects in the sensor image data. In other features, the method includes, for each of the identified target objects, generating a three-dimensional bounding box estimation output of the identified target object using the PointNet model.

In other features, the three-dimensional bounding box estimation output includes a position of the identified target object, a width of the identified target object, a length of the identified target object, and a height of the identified target object. In other features, the method includes generating a class semantic segmentation of objects according to the obtained sensor image data and combining the class semantic segmentation with the generated background mask of the convolutional neural network, to determine the point cloud data of the identified target objects to supply to the PointNet model.

In other features, the two-dimensional CNN includes a U-Net architecture, the U-Net architecture includes a contraction path including multiple convolutions each followed by a rectified linear unit (ReLU) and a max pooling operation, and spatial information is reduced while feature information is increased in the contracting path, and the U-Net architecture includes an expansion path configured to combine the feature information the spatial information though a sequence of up-convolutions and concatenations with high-resolution features from the contraction path.

In other features, the PointNet model is combined with a multilayer perceptron (MLP) model to generate the pixel level instance segmentation output of the identified target objects, and the MLP model is a fully connected feedforward artificial neural network (ANN). In other features, the obtained sensor image data includes ambient image data obtained by the SPAD Lidar sensor, intensity image data from a first echo group of the SPAD Lidar sensor, and depth image data from the first echo group of the SPAD Lidar sensor.

In other features, the PointNet model includes a classification network configured to take multiple points as input, apply input and feature transformations to the input, aggregate point features by max pooling, and output a classification score for multiple classes.

A computer system includes memory hardware configured to store a two-dimensional convolutional neural network (CNN) trained to generate a background mask by identifying target objects in obtained sensor image data and filtering out background pixels that do not belong to the identified target objects, a PointNet model trained to generate a pixel level instance segmentation output of the identified target objects based on point cloud data associated with the identified target objects, and computer-executable instructions. The system includes processor hardware configured to execute the instructions, wherein the instructions include obtaining sensor image data from photon detector of an SPAD Lidar sensor in communication with the processor hardware, supplying the obtained sensor image data to the trained two-dimensional CNN to generate a background mask by identifying target objects in the obtained sensor image data and filtering out background pixels that do not belong to the identified target objects, and supplying point cloud data of the identified target objects to a PointNet model to generate a pixel level instance segmentation output of the identified target objects.

In other features, the system includes the SPAD Lidar sensor, wherein the SPAD Lidar sensor is configured to obtain multiple return signals with a single laser pulse, capture infrared (IR) light to capture ambient scene illumination, and capture surface reflectance by measuring a strength of a detected laser pulse. In other features, supplying point cloud data of the identified target objects to the PointNet model includes supplying only point cloud data associated with the identified target objects, without supplying point cloud data associated with identified background pixels to the PointNet model.

In other features, the instructions further include training the two-dimensional CNN with historical sensor image data from SPAD Lidar sensors to generate the background mask, wherein the background mask is indicative of pixels that do not belong to identified target objects, and training the PointNet model with historical point cloud data to generate the pixel level instance segmentation output, wherein the pixel level instance segmentation output is indicative of identified target objects in the sensor image data. In other features, the instructions further include, for each of the identified target objects, generating a three-dimensional bounding box estimation output of the identified target object using the PointNet model.

In other features, the three-dimensional bounding box estimation output includes a position of the identified target object, a width of the identified target object, a length of the identified target object, and a height of the identified target object. In other features, the instructions further include generating a class semantic segmentation of objects according to the obtained sensor image data, and combining the class semantic segmentation with the generated background mask of the convolutional neural network, to determine the point cloud data of the identified target objects to supply to the PointNet model.

In other features, the two-dimensional CNN includes a U-Net architecture, the U-Net architecture includes a contraction path including multiple convolutions each followed by a rectified linear unit (ReLU) and a max pooling operation, and spatial information is reduced while feature information is increased in the contracting path, and the U-Net architecture includes an expansion path configured to combine the feature information the spatial information though a sequence of up-convolutions and concatenations with high-resolution features from the contraction path. In other features, the PointNet model is combined with a multilayer perceptron (MLP) model to generate the pixel level instance segmentation output of the identified target objects, and the MLP model is a fully connected feedforward artificial neural network (ANN).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computerized method for instance segmentation using a single-photon avalanche diode (SPAD) light detection and ranging (Lidar), the method comprising:
    obtaining sensor image data from photon detector of an SPAD Lidar sensor;
    supplying the obtained sensor image data to a two-dimensional convolutional neural network (CNN) to generate a background mask by identifying target objects in the obtained sensor image data and filtering out background pixels that do not belong to the identified target objects; and
    supplying only point cloud data associated with multiple identified target objects from an output of the two-dimensional CNN to a PointNet model to generate a pixel level instance segmentation output of the identified target objects, without supplying point cloud data associated with identified background pixels from the background mask to the PointNet model,
    wherein the PointNet model is combined with a multi-layer perceptron (MLP) model to generate the pixel level instance segmentation output of the identified target objects, and wherein the MLP model is a fully connected feedforward artificial neural network (ANN).

2. The computerized method of claim 1, wherein the Lidar sensor is configured to:
obtain multiple return signals with a single laser pulse;
capture infrared (IR) light to capture ambient scene illumination; and
capture surface reflectance by measuring a strength of a detected laser pulse.

3. The computerized method of claim 1, further comprising:
training the two-dimensional CNN with historical sensor image data from SPAD Lidar sensors to generate the background mask, wherein the background mask is indicative of pixels that do not belong to identified target objects; and
training the PointNet model with historical point cloud data to generate the pixel level instance segmentation output, wherein the pixel level instance segmentation output is indicative of identified target objects in the sensor image data.

4. The computerized method of claim 1, further comprising, for each of the identified target objects, generating a three-dimensional bounding box estimation output of the identified target object using the PointNet model.

5. The computerized method of claim 4, wherein the three-dimensional bounding box estimation output includes:
a position of the identified target object;
a width of the identified target object;
a length of the identified target object; and
a height of the identified target object.

6. The computerized method of claim 1, further comprising:
generating a class semantic segmentation of objects according to the obtained sensor image data; and
combining the class semantic segmentation with the generated background mask of the convolutional neural network, to determine the point cloud data of the identified target objects to supply to the PointNet model.

7. The computerized method of claim 1, wherein:
the two-dimensional CNN includes a U-Net architecture;
the U-Net architecture includes a contraction path including multiple convolutions each followed by a rectified linear unit (ReLU) and a max pooling operation, and spatial information is reduced while feature information is increased in the contracting path; and
the U-Net architecture includes an expansion path configured to combine the feature information and the spatial information though a sequence of up-convolutions and concatenations with high-resolution features from the contraction path.

8. The computerized method of claim 1, wherein the obtained sensor image data includes:
ambient image data obtained by the SPAD Lidar sensor;
intensity image data from a first echo group of the SPAD Lidar sensor; and
depth image data from the first echo group of the SPAD Lidar sensor.

9. The computerized method of claim 1, wherein the PointNet model includes a classification network configured to:
take multiple points as input;
apply input and feature transformations to the input;
aggregate point features by max pooling; and
output a classification score for multiple classes.

10. A computer system comprising:
memory hardware configured to store a two-dimensional convolutional neural network (CNN) trained to generate a background mask by identifying target objects in obtained sensor image data and filtering out background pixels that do not belong to the identified target objects, a PointNet model trained to generate a pixel level instance segmentation output of the identified target objects based on point cloud data associated with the identified target objects, and computer-executable instructions; and
processor hardware configured to execute the instructions, wherein the instructions include:
obtaining sensor image data from photon detector of an SPAD Lidar sensor in communication with the processor hardware;
supplying the obtained sensor image data to the trained two-dimensional CNN to generate a background mask by identifying target objects in the obtained sensor image data and filtering out background pixels that do not belong to the identified target objects; and
supplying only point cloud data associated with multiple identified target objects from an output of the two-dimensional CNN to a PointNet model to generate a pixel level instance segmentation output of the identified target objects, without supplying point cloud data associated with identified background pixels from the background mask to the PointNet model,
wherein the PointNet model is combined with a multilayer perceptron (MLP) model to generate the pixel level instance segmentation output of the identified target objects, and
wherein the MLP model is a fully connected feedforward artificial neural network (ANN).

11. The computer system of claim 10, further comprising the SPAD Lidar sensor, wherein the SPAD Lidar sensor is configured to:
obtain multiple return signals with a single laser pulse;
capture infrared (IR) light to capture ambient scene illumination; and
capture surface reflectance by measuring a strength of a detected laser pulse.

12. The computer system of claim 10, wherein the instructions further include:
training the two-dimensional CNN with historical sensor image data from SPAD Lidar sensors to generate the background mask, wherein the background mask is indicative of pixels that do not belong to identified target objects; and
training the PointNet model with historical point cloud data to generate the pixel level instance segmentation output, wherein the pixel level instance segmentation output is indicative of identified target objects in the sensor image data.

13. The computer system of claim 10, wherein the instructions further include, for each of the identified target objects, generating a three-dimensional bounding box estimation output of the identified target object using the PointNet model.

14. The computer system of claim 13, wherein the three-dimensional bounding box estimation output includes:
a position of the identified target object;
a width of the identified target object;
a length of the identified target object; and
a height of the identified target object.

15. The computer system of claim 10, wherein the instructions further include:
- generating a class semantic segmentation of objects according to the obtained sensor image data; and
- combining the class semantic segmentation with the generated background mask of the convolutional neural network, to determine the point cloud data of the identified target objects to supply to the PointNet model.

16. The computer system of claim 10, wherein:
- the two-dimensional CNN includes a U-Net architecture;
- the U-Net architecture includes a contraction path including multiple convolutions each followed by a rectified linear unit (ReLU) and a max pooling operation, and spatial information is reduced while feature information is increased in the contracting path; and
- the U-Net architecture includes an expansion path configured to combine the feature information and the spatial information though a sequence of up-convolutions and concatenations with high-resolution features from the contraction path.

* * * * *